US012585056B2

(12) United States Patent
Sharlin et al.

(10) Patent No.: US 12,585,056 B2
(45) Date of Patent: Mar. 24, 2026

(54) LIGHTGUIDE-BASED DISPLAY WITH LIGHT RECIRCULATION

(71) Applicant: Lumus Ltd., Ness Ziona (IL)

(72) Inventors: Elad Sharlin, Mishmar David (IL); Ronen Chriki, Lod (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/880,296

(22) PCT Filed: Sep. 4, 2023

(86) PCT No.: PCT/IL2023/050946
§ 371 (c)(1),
(2) Date: Dec. 31, 2024

(87) PCT Pub. No.: WO2024/047656
PCT Pub. Date: Mar. 7, 2024

(65) Prior Publication Data
US 2025/0389885 A1 Dec. 25, 2025

Related U.S. Application Data

(60) Provisional application No. 63/430,027, filed on Dec. 4, 2022, provisional application No. 63/403,758, filed on Sep. 4, 2022.

(51) Int. Cl.
*F21V 8/00* (2006.01)

(52) U.S. Cl.
CPC ......... *G02B 6/0035* (2013.01); *G02B 6/0076* (2013.01)

(58) Field of Classification Search
CPC ............... G02B 6/0036; G02B 6/0076; G02B 2027/0178
See application file for complete search history.

(56) References Cited

U.S. PATENT DOCUMENTS

| | | | |
|---|---|---|---|
| 2015/0247976 A1* | 9/2015 | Abovitz | G06V 10/758 385/37 |
| 2021/0033862 A1* | 2/2021 | Danziger | G02B 5/3025 |
| 2023/0007235 A1* | 1/2023 | Frevert | G02B 27/0006 |
| 2024/0345311 A1* | 10/2024 | Shimizu | G02B 27/1086 |
| 2025/0116865 A1* | 4/2025 | Volkov | G02B 27/0172 |
| 2025/0264648 A1* | 8/2025 | Klug | G02B 5/3016 |

* cited by examiner

*Primary Examiner* — Matthew J. Peerce
(74) *Attorney, Agent, or Firm* — Rivka Friedman

(57) ABSTRACT

A display includes a lightguide arrangement in which at least part of the image light is not coupled-out from the lightguide during a first pass of a coupling-out arrangement, and is recirculated so as to pass repeatedly the coupling-out arrangement. In one set of embodiments, recirculation of light is performed via a separate lightguide. In another set of embodiments, light is recirculated within a single lightguide, employing polarization management to avoid unwanted interactions between the light and the coupling-out arrangement.

16 Claims, 17 Drawing Sheets

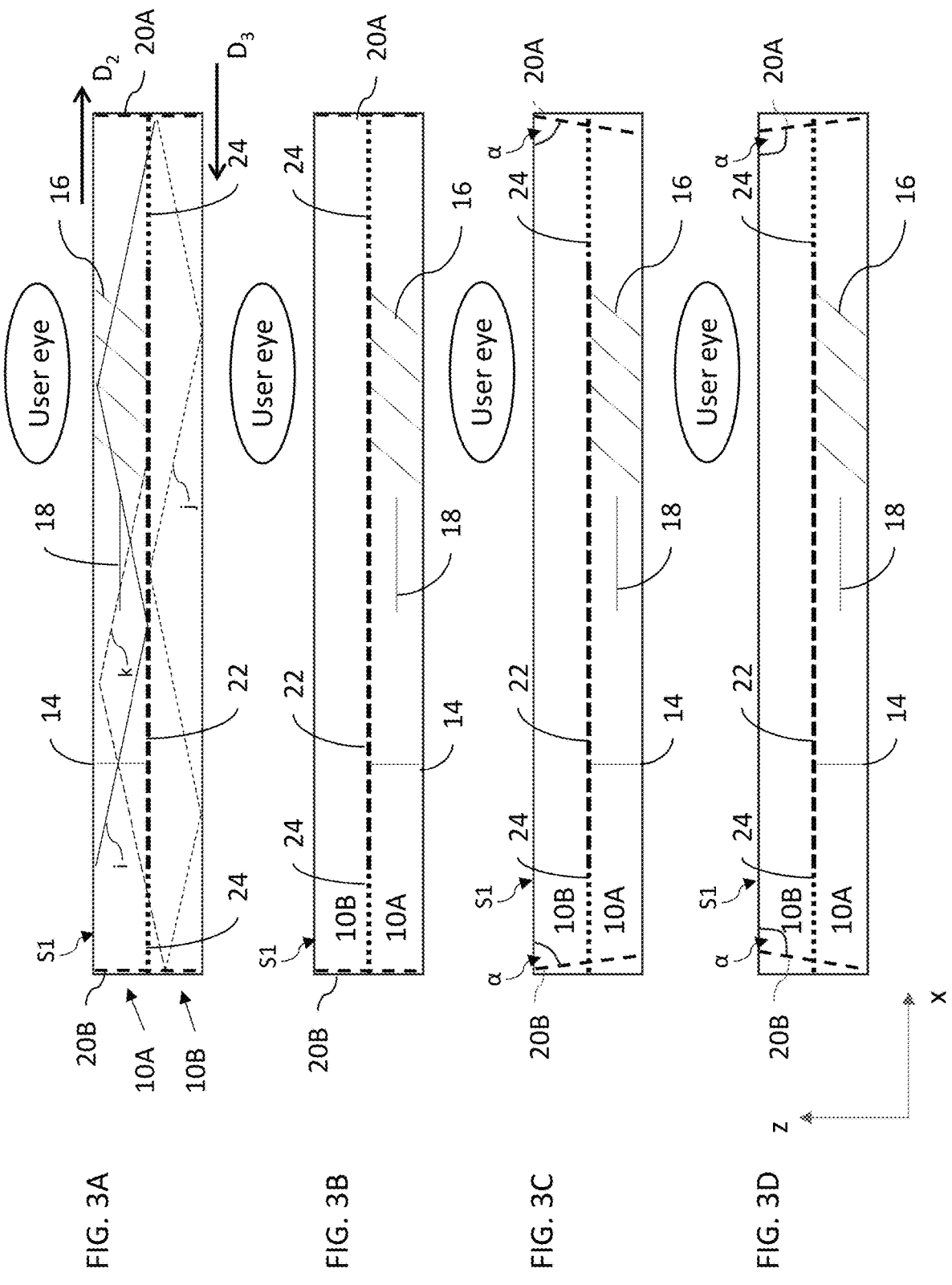

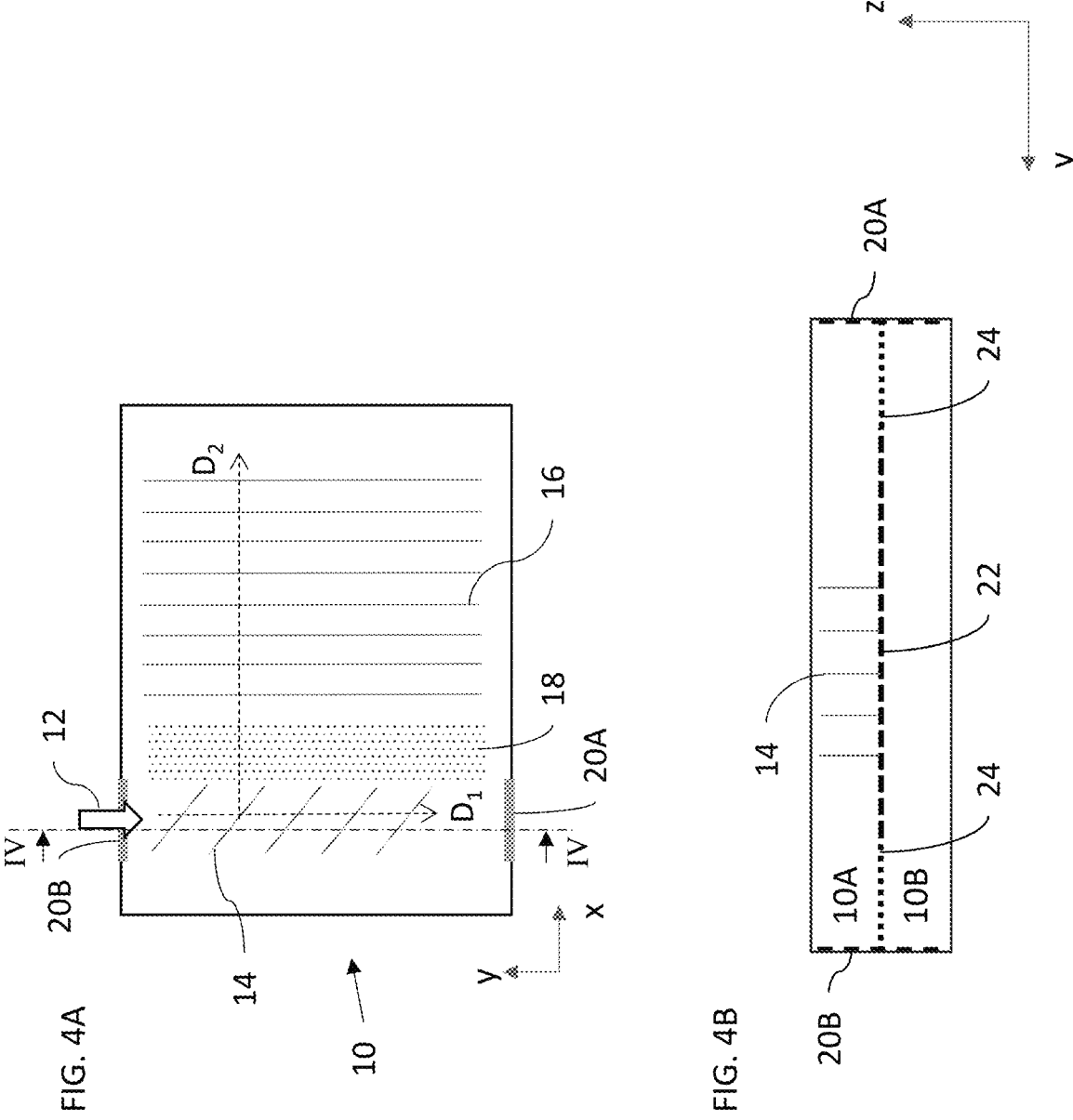

FIG. 19A
FIG. 19B
FIG. 19C
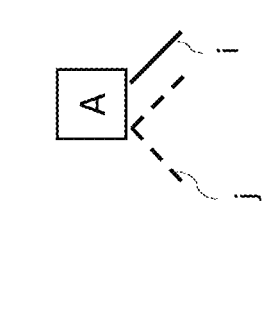
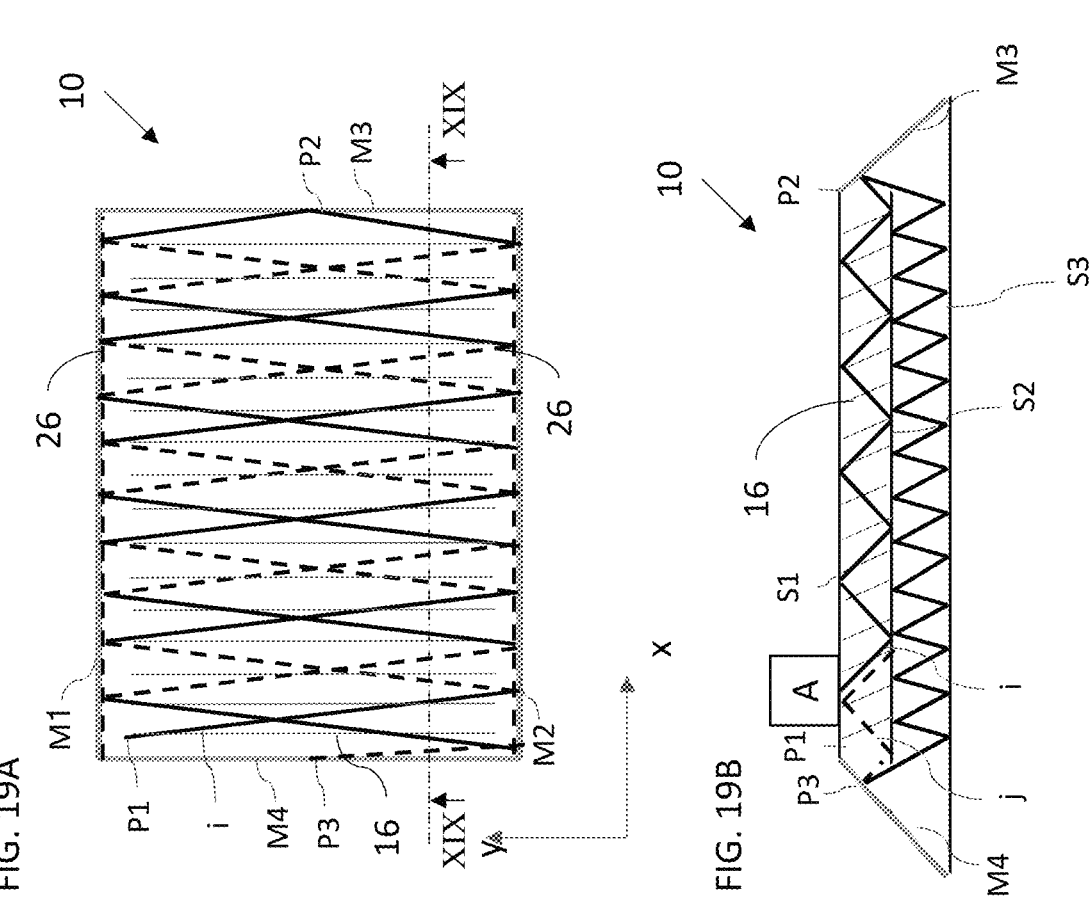

LIGHTGUIDE-BASED DISPLAY WITH LIGHT RECIRCULATION

FIELD AND BACKGROUND OF THE INVENTION

The present invention relates to lightguide-based displays and, in particular, it concerns a lightguide-based display in which light reaching an end of the lightguide is recirculated so as to pass again through the lightguide.

It is known to employ a lightguide to convey an image in front of an observer's eye and to couple out the image towards the observer for viewing. The image is coupled out by a suitable coupling-out arrangement, which may be a set of partially-reflective embedded reflectors, pin mirrors or a diffractive optical element. In some cases, the lightguide is configured to achieve two-dimensional aperture expansion, such as by using an additional set of embedded reflectors or a diffractive optical element to progressively deflect light propagating within the lightguide so as to redirect it towards the coupling-out arrangement.

A schematic illustration of a two-dimensional aperture expansion lightguide 100 is shown in FIG. 1 in plan view. An image is injected, typically via a coupling-in prism or via reflective coupling-in, as represented schematically by arrow 102 so as to propagate by internal reflection from top and bottom surfaces (parallel to the plane of the image) in a first direction $D_1$. and encounters a first set of mutually-parallel partially-reflecting internal surfaces (or "facets") 104 which progressively redirect (reflect) part of the image light in a second direction $D_2$. This light encounters a second set of mutually-parallel partially-reflecting internal surfaces (or "facets") 106 which progressively redirect (reflect) part of the image light outwards from the lightguide so as to couple out the image towards the observer for viewing. A homogenizing element or "mixer" 108, implemented as a partial reflector deployed between and parallel to the major surfaces of the lightguide, may be included in order to reduce non-uniformity in the output image. One or both of the sets of facets may be replaced by suitable surface or volume diffractive optical elements, embedded in the lightguide or on a surface of the lightguide, to redirect the image light, all as is known in the art.

In order to minimize disturbance to a scene viewed by the observer through the lightguide, the reflectivity (or diffractive efficiency) of at least the second set of facets, and possibly both sets of facets, is preferably relatively low. As a result, a significant proportion of the image light reaches the extremities of the lightguide, particularly in the shaded regions designated 110, resulting in loss of efficiency and image brightness.

SUMMARY OF THE INVENTION

The present invention is a display for delivering image light to an observer.

According to the teachings of an embodiment of the present invention there is provided, a display for delivering image light to an observer, the display comprising: (a) a first lightguide comprising a block of transparent material having two mutually-parallel major surfaces for supporting propagation of image light by internal reflection at the major surfaces, the lightguide containing at least one set of internal mutually-parallel partially-reflecting surfaces obliquely angled to the major surfaces so as to progressively couple-out part of the image light propagating in a first direction so as to be reflected towards an observer while transmitting part of the image light to continue propagating in the first direction within the first lightguide; (b) a second lightguide comprising a block of transparent material having two mutually-parallel major surfaces for supporting propagation of image light by internal reflection at the major surfaces, the second lightguide being deployed in stacked-relation to the first lightguide; (c) a first reflective coupling configuration comprising at least one planar mirror, the first reflective coupling configuration deployed to reflect the image light transmitted by the set of partially-reflecting surfaces and propagating in the first lightguide in the first direction so as to propagate within the second lightguide in a second direction having a reversed in-plane component from the first direction; and (d) a second reflective coupling configuration comprising at least one planar mirror, the second reflective coupling configuration deployed to reflect the image light that has traversed the second lightguide in the second direction so as to be reintroduced to propagate in the first lightguide in the first direction, such that at least part of the image light transmitted by the set of partially-reflecting surfaces in a first pass through the partially-reflecting surfaces is coupled out so as to be reflected towards the observer when again incident on the partially-reflecting surfaces.

There is also provided according to the teachings of an embodiment of the present invention, a display for delivering image light to an observer, the display comprising: (a) a first lightguide comprising a block of transparent material having two mutually-parallel major surfaces for supporting propagation of image light by internal reflection at the major surfaces, the first lightguide containing at least one set of internal mutually-parallel partially-reflecting surfaces non-parallel to the major surfaces so as to progressively redirect part of the image light propagating in a first direction so as to propagate by internal reflection within the first lightguide in a second direction while transmitting part of the image light to continue propagating in the first direction within the first lightguide; (b) a second lightguide comprising a block of transparent material having two mutually-parallel major surfaces for supporting propagation of image light by internal reflection at the major surfaces, the second lightguide being deployed in stacked-relation to the first lightguide; (c) a first reflective coupling configuration comprising at least one planar mirror, the first reflective coupling configuration deployed to reflect the image light transmitted by the set of partially-reflecting surfaces and propagating in the first lightguide in the first direction so as to propagate within the second lightguide in a third direction having a reversed in-plane component from the first direction; and (d) a second reflective coupling configuration comprising at least one planar mirror, the second reflective coupling configuration deployed to reflect the image light that has traversed the second lightguide in the second direction so as to be reintroduced to propagate in the first lightguide in the first direction, such that at least part of the image light transmitted by the set of partially-reflecting surfaces in a first pass through the partially-reflecting surfaces is redirected to propagate in the second direction when again incident on the partially-reflecting surfaces.

According to a further feature of an embodiment of the present invention, each of the first and second reflective coupling configurations comprises a single planar mirror and a light-transfer region adjacent to the single planar mirror within which there is an optical continuum between the first and second lightguides for transfer of image light between the first and second lightguides.

According to a further feature of an embodiment of the present invention, each of the single planar mirrors is oriented perpendicular to the major surfaces of the first and second lightguides.

According to a further feature of an embodiment of the present invention, the single planar mirror of the first reflective coupling configuration is oriented with a first inclination to the major surfaces of the first and second lightguides, and wherein the single planar mirror of the second reflective coupling configuration is oriented with a second inclination, equal but opposite to the first inclination, to the major surfaces of the first and second lightguides.

According to a further feature of an embodiment of the present invention, the optical continuum is implemented by connecting the first lightguide to the second lightguide using an index-matched adhesive.

According to a further feature of an embodiment of the present invention, the optical continuum is implemented by connecting a continuous block of transparent material to an edge surface of the first lightguide and the second lightguide.

According to a further feature of an embodiment of the present invention, each of the first and second reflective coupling configurations comprises a pair of mutually-perpendicular planar mirrors.

According to a further feature of an embodiment of the present invention, the second lightguide is attached to the first lightguide by a layer of adhesive having a low er refractive index than the transparent material of the first and second lightguides.

According to a further feature of an embodiment of the present invention, the second lightguide is separated from the first lightguide by an air gap.

There is also provided according to the teachings of an embodiment of the present invention, a display for delivering image light to an observer, the display comprising: (a) a lightguide comprising a block of transparent material having two mutually-parallel major surfaces for supporting propagation of image light by internal reflection at the major surfaces, the lightguide containing at least one set of internal mutually-parallel polarization-selective partially-reflecting surfaces obliquely angled to the major surfaces so as to progressively couple-out part of the image light of a first polarization propagating in a first direction so as to be reflected towards an observer while transmitting part of the image light of the first polarization to continue propagating in the first direction within the lightguide, the partially-reflecting surfaces being substantially transparent to light of a second polarization orthogonal to the first polarization; (b) a first reflective configuration comprising a quarter-wave phase plate and a planar mirror, the first reflective configuration deployed to reflect the image light transmitted by the set of partially-reflecting surfaces so as to propagate within the lightguide in a second direction having a reversed in-plane component from the first direction and a rotated polarization so as to be transmitted by the partially-reflecting surfaces; and (c) a second reflective configuration comprising a quarter-wave phase plate and a planar mirror, the second reflective configuration deployed to reflect the image light that has traversed the lightguide in the second direction so as to propagate within the lightguide in a direction parallel to the first direction, such that at least part of the image light transmitted by the set of partially-reflecting surfaces in a first pass through the partially-reflecting surfaces is coupled out so as to be reflected towards the observer when again incident on the partially-reflecting surfaces.

According to a further feature of an embodiment of the present invention, there is also provided an image injection aperture for injecting the image light into the lightguide so as to propagate in the first direction image by internal reflection at the major surfaces, and wherein the first direction is inclined relative to the first and second reflective configurations such that the image light introduced at the image injection aperture is incident on a first region of the partially-reflecting surfaces and, after reflection from the first reflective configuration and the second reflective configuration, is incident on a second region of the partially-reflecting surfaces, the second region being at least partially non-overlapping with the first region.

According to a further feature of an embodiment of the present invention, a reflectivity of the partially-reflecting surfaces in at least the first region is such that a majority of the image light injected at the image injection aperture is transmitted through the set of partially-reflecting surfaces and recirculated by reflection at the first and second reflective configurations.

According to a further feature of an embodiment of the present invention, the quarter-wave phase plate is part of a progressively varying phase plate.

According to a further feature of an embodiment of the present invention, there is also provided a partially-reflecting surface deployed internally to the lightguide, perpendicular to the major surfaces and parallel to the first and second reflective configurations.

There is also provided according to the teachings of an embodiment of the present invention, a display for delivering image light to an observer, the display comprising: (a) a lightguide comprising a block of transparent material having two mutually-parallel major surfaces for supporting propagation of image light by internal reflection at the major surfaces, the lightguide containing at least one set of internal mutually-parallel polarization-selective partially-reflecting surfaces non-parallel to the major surfaces so as to progressively redirect part of the image light propagating in a first direction so as to propagate by internal reflection within the lightguide in a second direction while transmitting part of the image light to continue propagating in the first direction within the lightguide, the partially-reflecting surfaces being substantially transparent to light of a second polarization orthogonal to the first polarization; (b) a first reflective configuration comprising a quarter-wave phase plate and a planar mirror, the first reflective configuration deployed to reflect the image light transmitted by the set of partially-reflecting surfaces so as to propagate within the lightguide in a third direction having a reversed in-plane component from the first direction and a rotated polarization so as to be transmitted by the partially-reflecting surfaces; and (c) a second reflective configuration comprising a quarter-wave phase plate and a planar mirror, the second reflective configuration deployed to reflect the image light that has traversed the lightguide in the third direction so as to propagate within the lightguide in a direction parallel to the first direction, such that at least part of the image light transmitted by the set of partially-reflecting surfaces in a first pass through the partially-reflecting surfaces is redirected to propagate in the second direction when again incident on the partially-reflecting surfaces.

BRIEF DESCRIPTION OF THE DRAWINGS

The invention is herein described, by way of example only, with reference to the accompanying drawings, wherein:

FIGS. 3A-3E are cross-sectional views taken along the line III-III of FIG. 2 according to variant implementations of the lightguide arrangement;

FIG. 4A is a schematic plan view of a display lightguide arrangement, constructed and operative according to a further embodiment of the present invention;

FIG. 4B is a cross-sectional view taken along the line IV-IV of FIG. 4A;

FIG. 19A is a schematic plan view of a display lightguide arrangement, constructed and operative according to a further embodiment of the present invention;

FIG. 19B is a cross-sectional view along the line XIX-XIX in FIG. 19A; and FIG. 19C is a schematic enlarged view of a coupling-in configuration from the display lightguide arrangement of FIG. 19B.

DESCRIPTION OF THE PREFERRED EMBODIMENTS

Figures 1, 2:
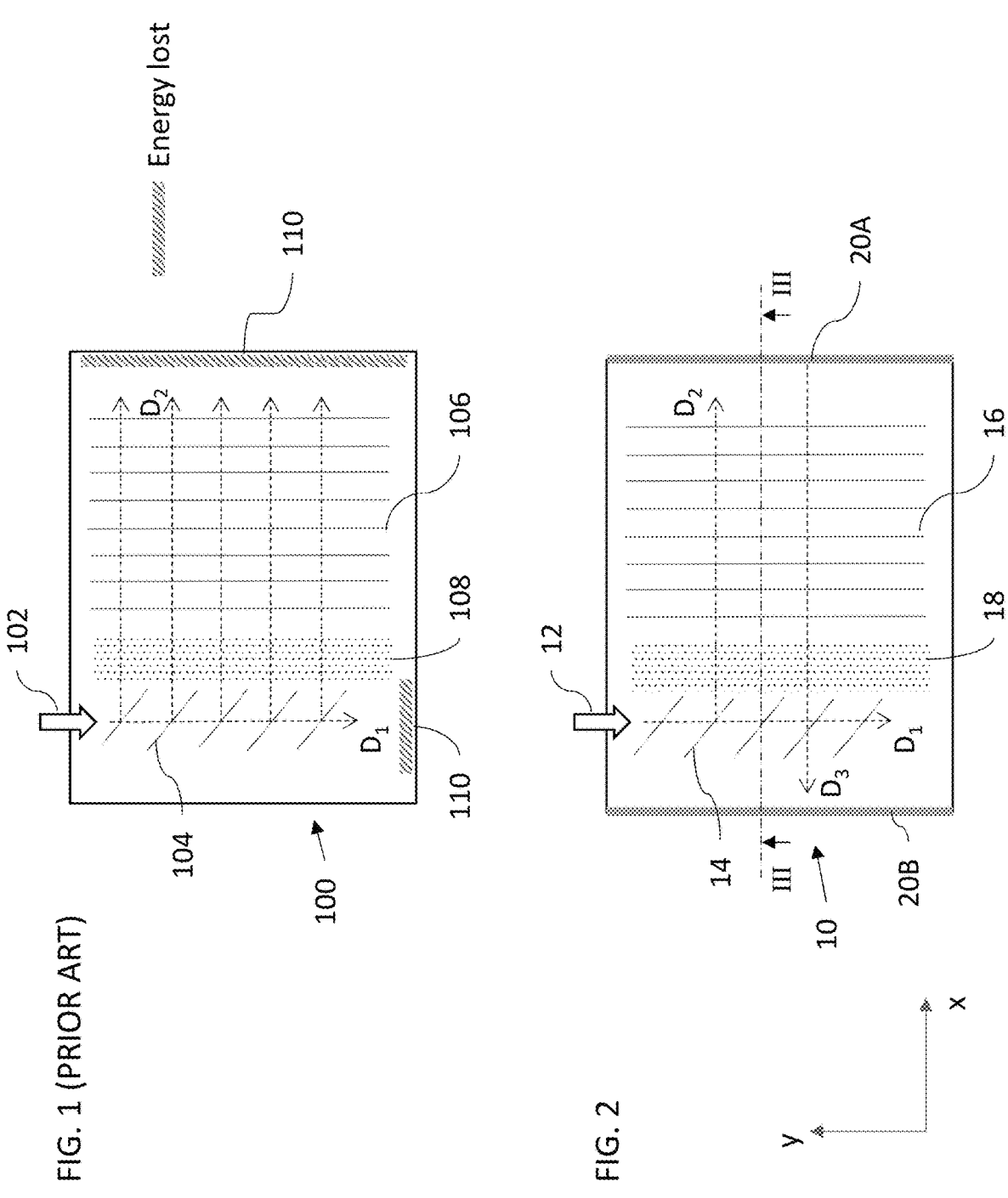
FIG. 1, described above, is a schematic plan view of a display lightguide providing two-dimensional aperture expansion.
FIG. 2 is a schematic plan view of a display lightguide arrangement, constructed and operative according to an embodiment of the present invention.

The present invention is a display for delivering image light to an observer.

The principles and operation of displays according to the present invention may be better understood with reference to the drawings and the accompanying description.

By way of introduction, various embodiments of the present invention are based on two families of solutions for light recirculation in a lightguide. According to a first set of embodiments, described herein with reference to FIGS. 2-5B, light reaching an edge of a first lightguide is coupled into a second, parallel lightguide to be guided back for reintroduction into the first lightguide so as to again traverse the second lightguide. In a second set of embodiments, illustrated with reference to FIGS. 6-13B, light is recirculated within a single lightguide, employing polarization management to avoid unwanted interactions between the light and the coupling-out arrangement. The remaining drawings relate to further variations, combinations and applications of these approaches, including recirculation of light along more than one in-plane axis.

The present invention is presented herein as a display. More specifically, the present invention relates primarily to various lightguide configurations for conveying an image from an image projector so as to deliver the image to the eye of a user, typically in the context of an augmented reality display, where the user can simultaneously view the real world via the lightguide configuration. The invention is applicable to all sizes and types of display, from near-eye and/or head-mounted displays up to automotive head-up displays, or larger. A full display implementation includes additional components, including an image projector for generating the desired image, and a coupling arrangement for coupling the projected image into the lightguide so as to propagate within the lightguide by internal reflection. The image projector itself typically includes an image generator, which may be based on LCD elements, a scanning modulated laser beam, a digital light processor, an active-matrix display or any other image generator, and collimating optics for collimating and delivering the image to a projector output aperture. The coupling-in arrangement may employ a coupling prism, a diffractive optical element and/or one or more reflector deployed to introduce the image into the lightguide within a desired range of propagation angles. This is in addition to power supply components, processing components for driving the image generator, and mechanical components for supporting all of the above in the required deployment for use, relative to the user's head, a vehicle or as required for any other application. All of the above components are well known in the art, and for conciseness of presentation, are not dealt with further herein.

Additionally, although presented as a display, the various implementations of a lightguide described herein may also be used to advantage in various illumination applications, where the lightguide does not itself convey an image, but rather provides illumination, such as for illuminating an LCOS image generator as part of a display.

Light Recirculation by Additional Lightguide

Thus, according to certain embodiments of the present invention, light that would otherwise be lost on reaching an extremity of a lightguide, can be reinjected into the waveguide, so as to increase to overall efficiency of the waveguide. One embodiment is shown in FIGS. 2 and 3A, where losses in the LOE are reduced by adding another inert lightguide 10B below a lightguide 10A, and two parallel mirror plates 20 on both sides of the lightguide pair, to form an optical cavity, enabling the recovery of otherwise lost light at the far-right side of the waveguide.

In the non-limiting example illustrated here, lightguide 10A is a two-dimensional aperture expansion lightguide employing two sets of mutually-parallel internal partially-reflecting surfaces. An image is injected via an image injection aperture, typically via a coupling-in prism or via reflective coupling-in, as represented schematically by arrow 12 so as to propagate by internal reflection from top and bottom surfaces (parallel to the plane of the image) in a first direction $D_1$, and encounters a first set of mutually-parallel partially-reflecting internal surfaces (or "facets") 14 which progressively redirect (reflect) part of the image light in a second direction $D_2$. This light encounters a second set of mutually-parallel partially-reflecting internal surfaces (or "facets") 16 which progressively redirect (reflect) part of the image light outwards from the lightguide so as to couple out the image towards the observer for viewing. A homogenizing element or "mixer" 18, implemented as a partial reflector deployed between and parallel to the major surfaces of the lightguide, may be included in order to reduce non-uniformity in the output image. One or both of the sets of facets may be replaced by suitable surface or volume diffractive optical elements, embedded in the lightguide or on a surface of the lightguide, to redirect the image light, all as is known in the art. The invention is also not limited to lightguides with two-dimensional aperture expansion.

Here and throughout the description and claims, wherever reference is made to a direction of propagation, unless explicitly stated otherwise, this relates to the in-plane direction of propagation, i.e., the component of the ray directions parallel to the major surfaces of the lightguide. Propagation within the lightguide occurs by repeated internal reflection at the major surfaces, as will be illustrated in some certain side views, but the "direction of propagation" within the lightguide is taken to be the in-plane component. Additionally, unless indicated otherwise, the "direction" refers to all rays propagating in the same or parallel in-plane directions, even if displaced/offset from each other.

In the first set of embodiments, recirculation of light is achieved by use of a second lightguide 10B implemented as a block of transparent material having two mutually-parallel major surfaces for supporting propagation of image light by internal reflection at the major surfaces. Second lightguide 10B is deployed in stacked-relation to first lightguide 10A.

A first reflective coupling configuration, including at least one planar mirror 20A, is deployed to reflect the image light transmitted by second set of partially-reflecting surfaces 16 and propagating in first lightguide 10A in second direction $D_2$ so as to propagate within the second lightguide in a reflected direction $D_3$ having a reversed in-plane component (reversal of the component perpendicular to the planar mirror 20B) from direction $D_2$. A second reflective coupling configuration, including at least one planar mirror 20B, is deployed to reflect the image light that has traversed the second lightguide in the reflected direction so as to be reintroduced to propagate in first lightguide 10A in the first direction, such that at least part of the image light transmitted by the set of partially-reflecting surfaces in a first pass through the partially-reflecting surfaces is coupled out so as to be reflected towards the observer when again incident on the partially-reflecting surfaces.

This is further explained with reference to FIG. 3A. Injected ray i enters via main surface (S1) and propagates via total internal reflection (TIR) until it impinges on the far mirror 20A and returns into the lightguide as ray j subsequently impinging on second mirror 20B and returning into the lightguide as ray k. It is noted that ray i and k are parallel as seen in FIG. 3A. To maintain TIR conditions in the regions of first and second sets of facets 14, 16 and mixer 18, and to allow passage of light between lightguide 10A and inert glass 10B, a low refractive index (RI) glue should be employed between the lightguides in region 22 and index-matched glue should be employed in regions 24. Alternative implementations may use an airgap in region 22, which is maintained by inserting thin index-matched plates in regions 24. Yet another option is to provide the internal reflection properties in region 22 by employing multilayer dielectric coatings designed to provide angularly-selective properties mimicking TIR properties, with high reflectivity at high angles and high transparency at small angles (i.e., near-perpendicular to the lightguide major surfaces), as is known in the art.

In a first set of implementations, each of the first and second reflective coupling configurations is implemented with a single planar mirror 20A, 20B and a light-transfer region 24, adjacent to the single planar mirror, within which there is an optical continuum between the first and second lightguides for transfer of image light between the first and second lightguides. In the case of FIGS. 3A and 3B, these planar mirrors are oriented perpendicular to the major surfaces of the first and second lightguides (e.g., the top surface labeled S1). As a result, the propagation angles of the rays in second lightguide 10B are the same of those in first lightguide 10A. FIG. 3B is structurally and functionally equivalent to FIG. 3A, but illustrates that first lightguide 10A can be implemented on the side further from the user's eye, with the coupled-out light passing through second lightguide 10B before reaching the eye.

According to a further option illustrated in FIGS. 3C and 3D, the single planar mirror 20A of the first reflective coupling configuration is oriented with a first inclination a to the major surfaces S1 of the lightguides, and the single planar mirror 20B of the second reflective coupling configuration is oriented with a second inclination, equal in magnitude to first inclination a but oppositely inclined to the major surfaces S1 of the lightguides. This inclination results in the light rays propagating within the second lightguide at different ray angles (either shallower angles or steeper angles relative to the major lightguide surfaces) compared to the rays in the first lightguide. After reflection at the second reflective coupling configuration, the angles are restored to the original ray angles for propagation along the first lightguide.

Figure 3E:
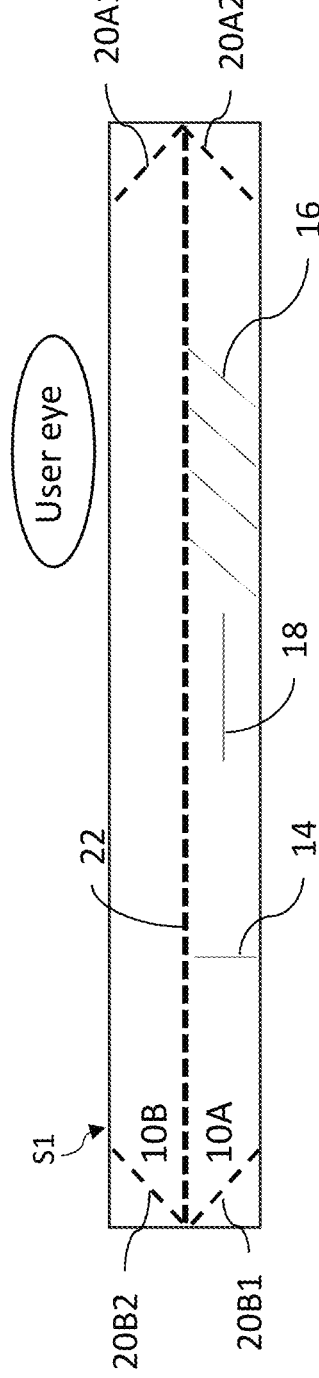

FIG. 3E illustrates a further variation of the reflective coupling configurations according to which each of the first and second reflective coupling configurations includes a pair of planar mirrors 20A1, 20A2, 20B1 and 20B2, that are preferably arranged mutually-perpendicular, forming a right-angled reflector, with each reflector preferably at 45 degrees to the major surfaces of the lightguide. In this case, image light is transferred between the first and second lightguides after reflection at a first of these mirrors 20A1 or 20B1 and before reflection in the second of these mirrors 20A2 or 20B2, while the rays are at relatively small angles to the normal to the major surfaces. This allows the entire interface between the first and second lightguides to be implemented using low refractive index adhesive, since the light transferred between the lightguides at an angle of incidence smaller than the critical angle.

Although FIGS. 2-3E have illustrated recirculation of image light in the "X" direction, i.e., the light passing through set of facets 16, in the case of a two-dimensional aperture expansion lightguide as shown, the same principles may be implemented to recirculate light passing through the set of facets 14 (or a diffractive optical element performing an equivalent function of redirecting image light progressively within the lightguide, prior to coupling out). This option is illustrated in FIGS. 4A and 4B. The same reference numbers as above are used throughout.

Figures 5A, 5B:
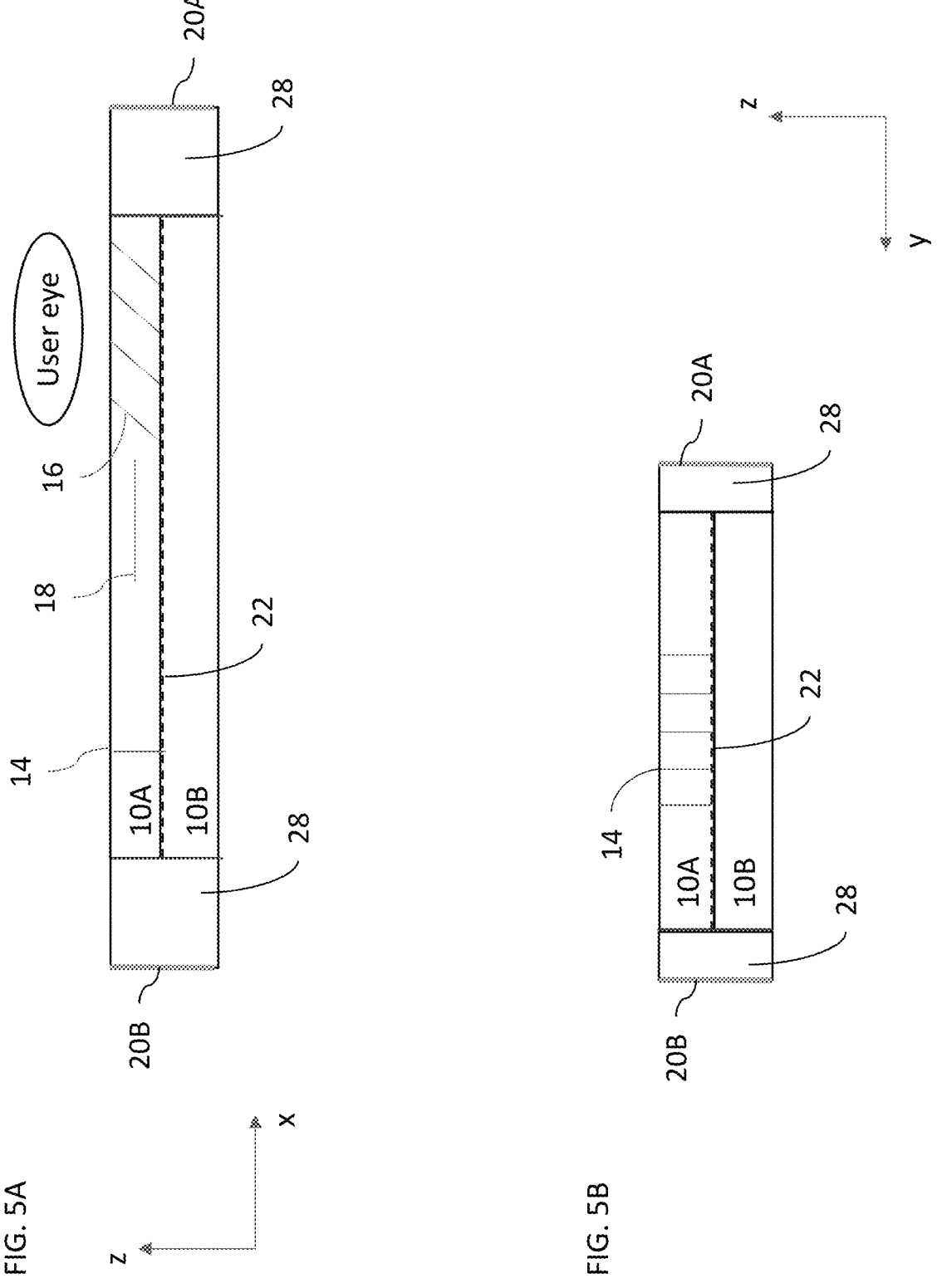
FIGS. 5A and 5B are cross-sectional views similar to FIGS. 3A and 4B, respectively, illustrating an alternative construction of the lightguides.

In an alternative implementation, the optical continuum between lightguides 10A and 10B is implemented by connecting a continuous block 28 of transparent material to edge surfaces of the first and second lightguides 10A, 10B, and employing index-matched adhesive at the interface between the lightguides and block 28, which are perpendicular to the major surfaces of the lightguides. FIGS. 5A and 5B illustrate to examples of such an implementation, where the recirculation of image light is in the X direction and in the Y direction, respectively. These configurations are substantially equivalent optically to the implementations of FIGS. 3A and 4B, respectively, but may have production advantages.

Light Recirculation by Polarization Management

Figure 6:
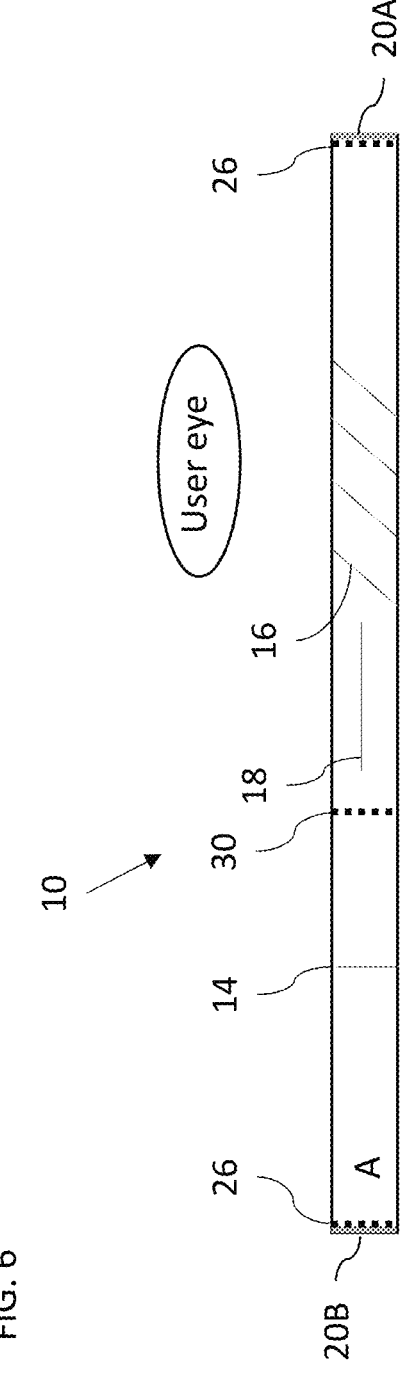
FIG. 6 is a schematic side view of a display lightguide arrangement, constructed and operative according to a further embodiment of the present invention.

Turning now to FIG. 6, this illustrates an alternative principle of operation for recycling of light along a lightguide. In this case, light is recycled within a single lightguide, and unwanted interaction between the image light and a coupling-out arrangement (and/or a redirection arrangement for a first dimension of aperture expansion) is avoided by suitable polarization management.

Specifically, in this case, referring by way of a non-limiting example to a facet-based lightguide, a lightguide 10 contains at least one set of internal mutually-parallel polarization-selective partially-reflecting surfaces 16 obliquely angled to the major surfaces so as to progressively couple-out part of the image light of a first polarization (e.g., S-polarization) propagating in a forward direction so as to be reflected towards an observer while transmitting part of the image light of the first polarization to continue propagating in the forward direction within the lightguide. The partially-reflecting surfaces are implemented so as to be substantially transparent to light of a second polarization (e.g., P-polarization) perpendicular to the first polarization. Recycling of the image light reaching the end of the lightguide is achieved by providing a first reflective configuration comprising a quarter-wave phase plate 26 and a planar mirror 20A. This first reflective configuration is deployed to reflect the image light transmitted by set of partially-reflecting surfaces 16 so as to propagate within the lightguide in a reflected direction having a reversed in-plane component from the forward direction and a rotated polarization (from S to P) so as to be transmitted by the partially-reflecting surfaces 16. A second reflective configuration, including a quarter-wave phase plate 26 and a planar mirror 20B, is deployed to reflect the image light that has traversed at least part of the lightguide in the reflected direction so as to propagate within the lightguide in the forward direction with rotated polarization (from P to S), such that at least part of the image light transmitted by the set of partially-reflecting surfaces in a first pass through the partially-reflecting surfaces is coupled out so as to be reflected towards the observer when again incident on the partially-reflecting surfaces.

In certain applications, such as in a reflective two-dimensional aperture expansion lightguide as illustrated, the polarization requirements may vary along the length of the lightguide. Specifically, referring back to FIG. 2, if first set of partially-reflecting surfaces 14 are partially reflective to S-polarization, and transparent to P-polarization, the different orientation of surfaces 14 and 16 results in the S-polarization reflected from surfaces 14 presenting as P polarization to surfaces 16. In order to present S-polarization to surfaces 16, a half-wave phase plate 30 (FIG. 6) is advantageously interposed between surfaces 14 and 16 to rotate the polarization. Phase plate 30 complements the function of quarter-wave phase plates 26 in this implementation to keep the polarization of the light propagating in the "reverse" direction (right-to-left as illustrated) correctly conditioned to avoid unwanted interaction between the surfaces and the returning image light.

Applications of Light Recirculation

The configurations described thus far may be used to advantage to enhance energy efficiency of a lightguide-based display by recycling light which would otherwise be lost. This may, for example, facilitate achieving enhanced display brightness even when employing low visibility coupling-out arrangements with low reflectivity or low diffractive efficiency, such as when visibility of the coupling-out arrangement needs to be minimized. The passing of image light repeatedly through a set of facets with low reflectivity, or past a diffractive optical element with low coupling efficiency, can be used to compensate for the low coupling-out power from each pass of the image light past the coupling-out arrangement.

Additionally, the various schemes for recirculating image light presented above are also believed to be enabling technology for a range of applications. In one important subset of additional applications, the recirculated image light does not follow the same path as the light originally injected into the lightguide. One such example is illustrated schematically in FIGS. 7A-7C.

Figures 7A, 7B, 7C:
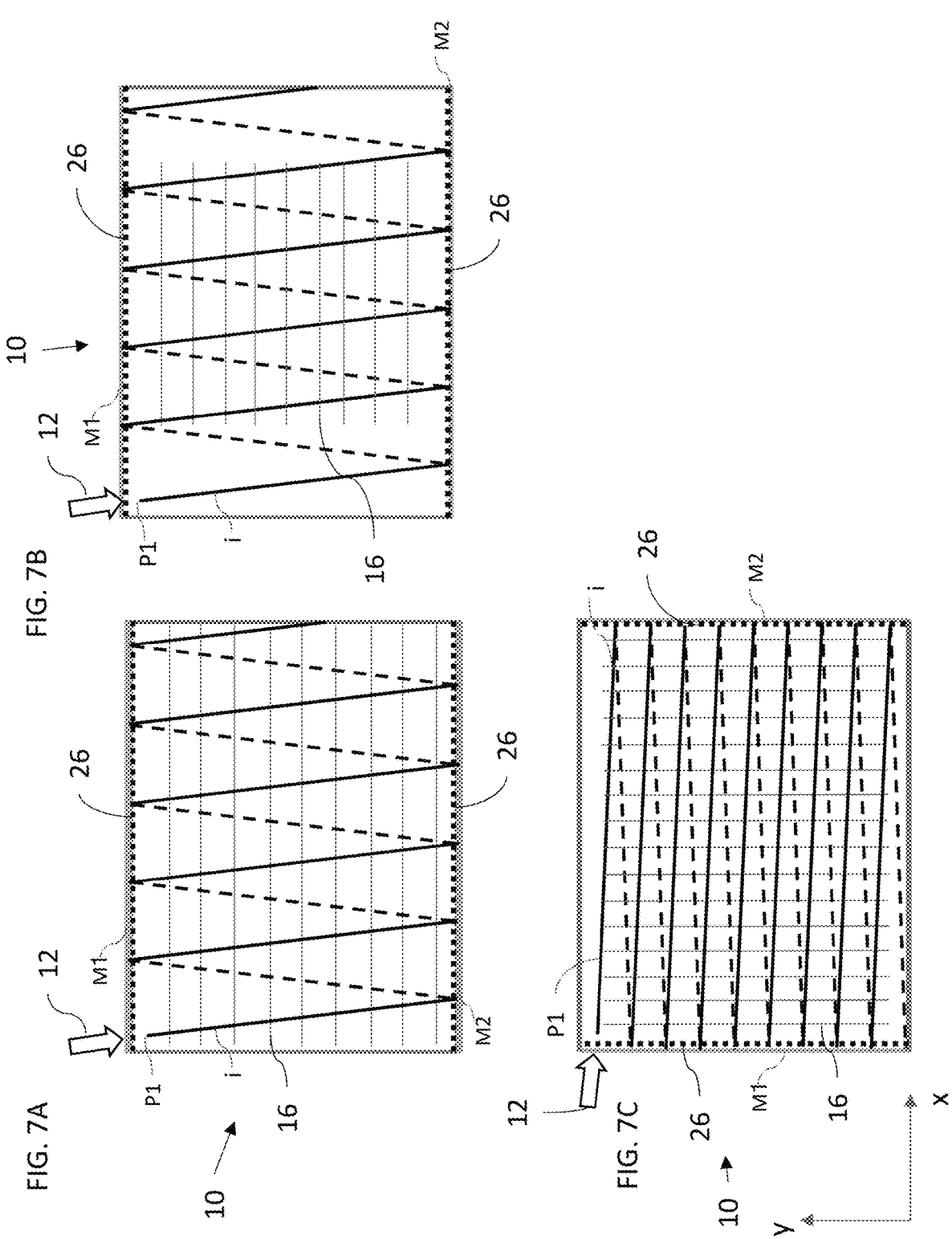
FIG. 7A is a schematic plan view of a display lightguide arrangement, constructed and operative according to a further embodiment of the present invention, employing recirculation of image light to achieve aperture expansion.
FIG. 7B is a view similar to FIG. 7A but employing a different deployment of partially-reflecting coupling-out surfaces.
FIG. 7C is a view similar to FIG. 7A but employing recirculation of image light along an X-axis direction.

Specifically, FIG. 7A shows a lightguide 10 with a set of coupling-out partially-reflecting surfaces 16 with an image injection aperture, represented schematically by arrow 12, for injecting image light from a suitable projector into the lightguide so as to propagate in a first direction by internal reflection at the major surfaces (front and back surfaces in the plan view as illustrated). The first direction is inclined relative to the first and second reflective configurations (mirrors M1 and M2 and quarter-wave phase plates 26) such that the image light introduced at the image injection aperture is incident on a first region of the partially-reflecting surfaces 16 and, after reflection from the first reflective configuration and the second reflective configuration, is incident on a second region of the partially-reflecting surfaces 16, the second region being at least partially non-overlapping with the first region. Thus, successive recirculation of the image light illuminates successive regions of each partially-reflecting surface 16, thereby achieving aperture expansion in the X direction (in addition to the expansion in the Y direction that is achieved by partial reflection at a sequence of surfaces). This arrangement may thus achieve two-dimensional aperture expansion.

Where multiple cycles of light recirculation are to be used, it is preferable to choose the reflectivity of the partially-reflecting surfaces in at least the first region to be sufficiently low that a majority of the image light injected at the image injection aperture is transmitted through the set of partially-reflecting surfaces and recirculated by reflection at the first and second reflective configurations.

Thus, as shown in FIG. 7A, S-polarized ray i is injected into lightguide at P1 and trapped due to parallel mirrors (M1 and M2) in the y dimension. Ray i is also trapped in the z dimension (TIR—into the page, not shown). In the x dimension, ray i will finally be absorbed and lost on the lightguide edges. When ray i impinges on the lower quarter-wave plate (QWP) 26 and M2 it will be reflected into the lightguide, and its polarization will be changed to P-polarized. When ray i impinges on the upper QWP and M1, it is reflected back into the lightguide, and its polarization is changed back to S-polarized. Assuming partially-reflecting surfaces 16 are implemented with multilayer dielectric coatings designed to partially-reflect and couple out only some of the S-polarized light and to be transparent to P-polarized light, only top-to-bottom rays will be partially reflected to direct their path into the user's eye. FIG. 7B is similar to FIG. 7A, but illustrates that the partially-reflecting facets do not have to cover the entire lightguide aperture and may be restricted to only a portion of it. FIG. 7C illustrates a further case similar case to FIG. 7A in which the 2D restriction is in the x and z dimensions.

In the above example, the partially-reflecting facets were shown to be parallel to mirrors M1 and M2, but this is only a non-limiting example, and the facets may be implemented at any desired angle such as, for example, perpendicular to the propagation direction of the chief ray of the image light. Furthermore, the mirrors and QWP were illustrated to be at the edges of the waveguide, but this is only a non-limiting example, and these elements may be positioned at other locations within the lightguide.

Figure 8:
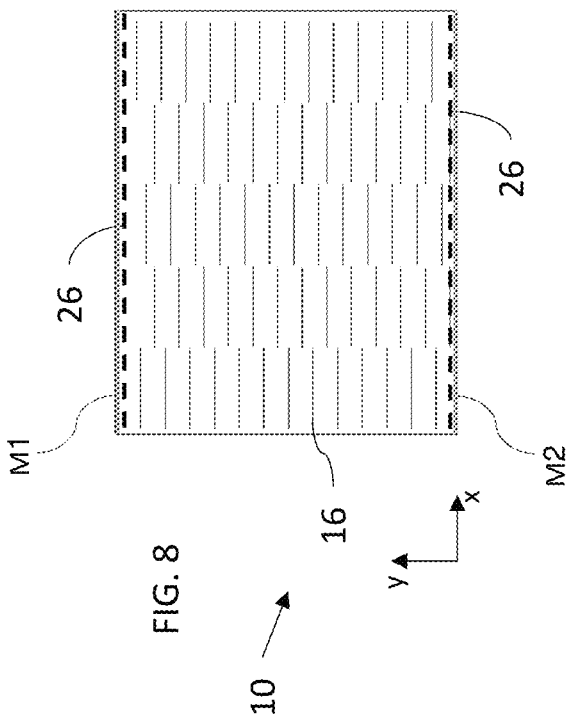
FIG. 8 is a view similar to FIG. 7A but employing subdivided partially-reflecting coupling-out surfaces.
Figure 10:
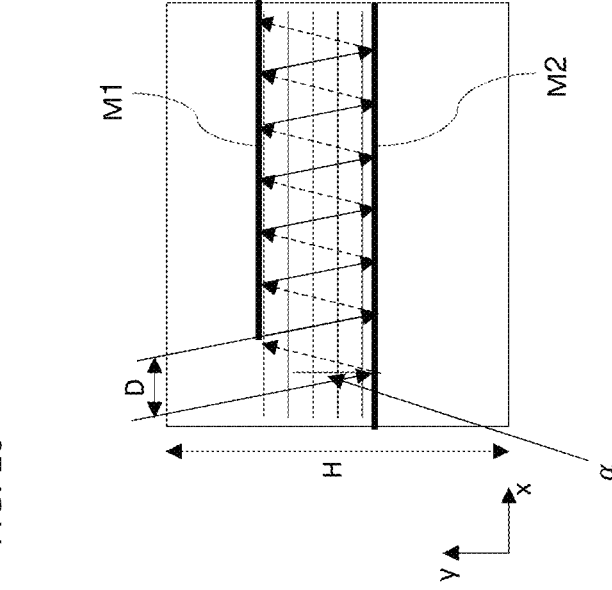
FIGS. 9 and 10 are views similar to FIG. 7A illustrating parameters which impact the degree of filling of the lightguide with an image, and varying with regard to a distance between two mirrors.

As light propagates inside the waveguide and bounces back and forth between mirrors M1 and M2, light is gradually coupled out of the waveguide and into the eye motion box ("EMB"—the region within which the eye of the user is assumed to be for viewing the projected image). Consequently, the intensity of image light propagating within the waveguide gradually decreases, potentially leading to an intensity gradient across the field of view (FoV) and across the eye motion box. To overcome this effect, the facet coatings can be implemented so that they progressively increase in reflectivity along the x-axis in FIG. 7A, either as a gradual increase or in steps of different reflectivities. In one such implementation, the facets can be composed of several sections, which are not necessarily aligned into continuous surfaces, where the reflectivity of the sections increases according to their position along the x-axis. This at least partially compensates for the decreasing image light intensity propagating within the lightguide during sequential recirculation of the light. This option is illustrated in FIG. 8.

Figure 9:
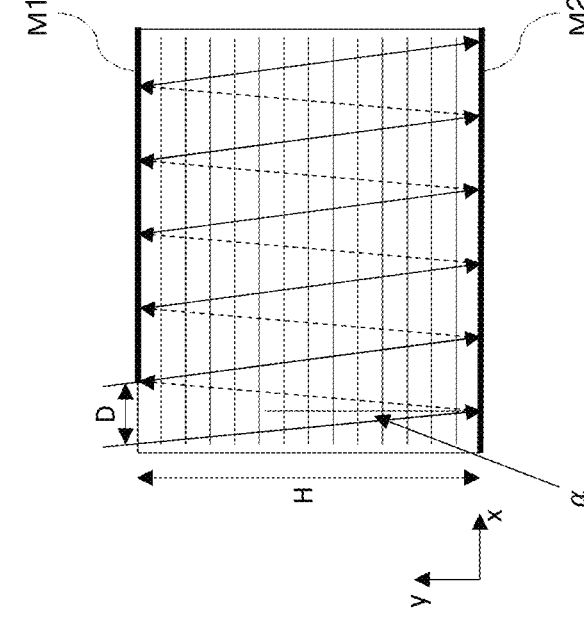

In order to achieve a uniform output image, light propagating inside the waveguide should uniformly cover the entire output region, i.e., the region where the facets must output light to the eye motion box. This condition is referred to as aperture filling. FIG. 9 shows the ray trajectories of a single field (i.e., a single collimated ray, which eventually corresponds to a pixel of the projected image on the retina of the observer) which is injected into the waveguide. The injected field has an initial width D in the x-axis and an angle $\alpha$ with relation to a norm to the extensional direction of parallel mirrors M1 and M2. The height of the waveguide is denoted by H. It is clear that aperture filling is achieved if the projection of the injected ray onto the x-y plane creates an angle do with relation to the normal to mirrors M1 and M2, where:

$$\alpha_0 = \tan^1(D/2H) \sim \frac{D}{2H}.$$

A field with angles $\alpha < \alpha_0$ will overlap the entrance aperture of the lightguide, which may lead to energy loss. Fields with angles $\alpha > \alpha_0$ will not be fully filled. However, since the eye pupil of the user is few millimeters in diameter, the eye will, to a certain extent, average local nonuniformities. Therefore, even with partial aperture filling, satisfactory results may be achieved. Generally, the ratio of aperture filling $\eta$ for fields with $\alpha > \alpha_0$ can be quantified as $\eta = \alpha_0/\alpha$.

The minimal level of aperture filling $\eta_{min}$ should be determined by the requirements of a specific system (e.g., the assumed size of eye pupil, the required intensity uniformity). The value of $\eta_{min}$ determines the maximum field of view in the x-y plane that can be supported by the waveguide:

$$FOV_{max} = \alpha_0 \frac{1-\eta}{\eta} \sim \frac{D}{2H} \frac{1-\eta}{\eta}.$$

The largest field of view supported by the waveguide $FOV_{max}$ grows linearly with input aperture size D, and inversely with the distance H between mirrors M1 and M2. The size of the projector typically scales with the input size, so increasing the size of aperture D may not be a desirable option, especially in compact systems. Therefore, practically, it may be preferred to have a short distance between mirrors M1 and M2, so that a large field of view could be guided. This is illustrated schematically in FIG. 10.

Figure 11:
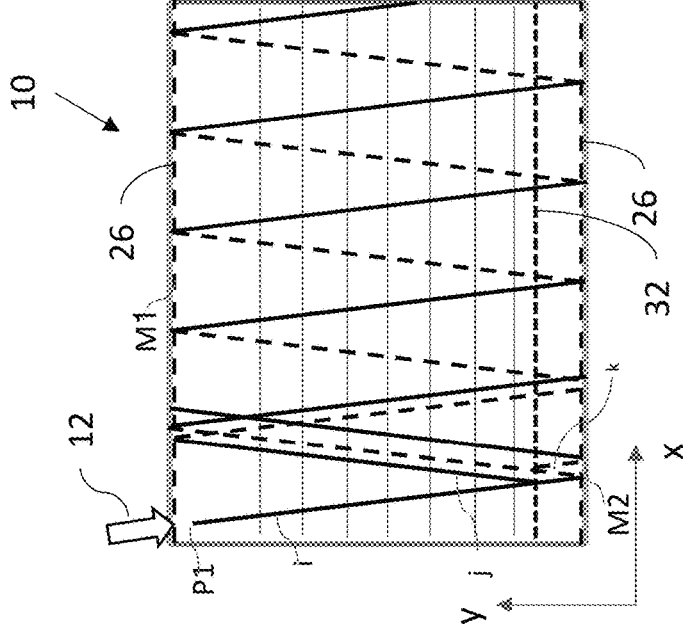
FIG. 11 is a view similar to FIG. 7A illustrating a display lightguide arrangement employing an additional mixer element.

It is noted, however, that the FoV and the size of the eye motion box (both in the direction of the y-axis) dictate a minimal spacing between the mirrors M1 and M2, which may impose design limitations that limit how much the FoV can be expanded in the direction of the x-axis by this approach. An additional approach to address these limitations is addition of a partially-reflecting surface or "mixer" 32, deployed internally to the lightguide, perpendicular to the major surfaces and parallel to the first and second reflective configurations (mirrors M1 and M2), as illustrated in FIG. 11. The mixer preferably has roughly 50% reflectivity. The mixer acts to decrease the effective distance between mirrors (which here becomes the distance between mirror and mixer), while still supporting a large active area, and therefore also a large eye motion box and large FoV, Consequently, the mixer helps fill the lightguide aperture and improve overall uniformity. Optionally, a plurality of mixers may be added at different positions in the lightguide. An orthogonal mixer (a mixer with the same orientation as mixer 18 in FIG. 2) can also be added.

The various aperture expansion architectures of FIGS. 7A-11 can be implemented using either of the recirculation principles described above, either with a separate lightguide for the return propagation or using polarization management within a single lightguide. In the latter case, where mixer 32 is used, it is preferably combined with a quarter-wave plate on one side and a quarter-wave plate with opposite sign on the other side. This ensures that any light which is transmitted by the mixer has its polarization state unchanged, while any light which is reflected has its polarization state rotated, to switch P to S and S to P.

As 2D-restriction preserves energy on two axes, it is expected to be more efficient than a typical 1D-restricted waveguide. For good image quality, mirrors (M1 and M2) should be of high optical quality and parallel to within high manufacturing tolerances. Also, it is preferred that the mirrors will be embedded inside a glasses frame or be otherwise covered, so as to avoid unwanted world ghosts reaching the user's eyes.

Figure 12:
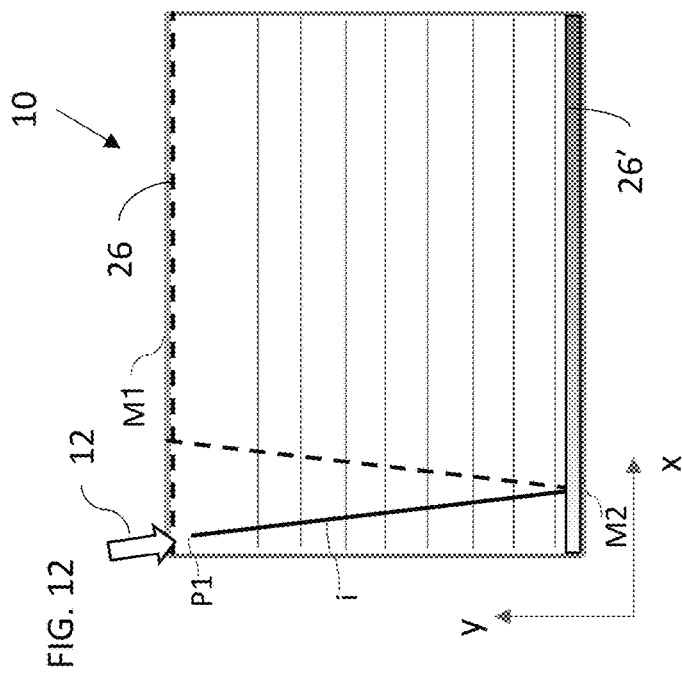
FIG. 12 is a view similar to FIG. 7A illustrating a display lightguide arrangement employing a phase plate with progressively varying efficiency.

Another approach to enhancing image uniformity is illustrated in FIG. 12. In this example, one of the mirrors is provided with a phase plate 26' with gradually varying efficiency that increases along the X axis, and a non-pure P-polarized ray is injected into lightguide at point P1. When ray i reaches the gradually-varying efficiency phase plate, only part of the P-polarized light is transformed to S-polarized. As the rays advance along the x direction, the efficiency of the phase plate increases, becoming progressively closer to performance as a full QWP which will transform all p-polarized light to s-polarized light, resulting in a maximal reflected intensity. In this way, intensity (that is a function of the S-polarization light reflected by the facets) can be controlled along the x axis direction.

More generally, it should be noted that, while a quarter waveplate is believed to be the appropriate choice for various implementations of the invention described herein, some architectures, and particularly where more complex geometries are involved, may employ other fractional-wave phase plates associated with mirrors at the perimeter of the lightguide and/or otherwise placed in the optical arrangement.

Another parameter which may be varied to help address non-uniformity is a gradual variation in the reflectivity of one of the mirrors M2, where the mirror reflection would increase with progression along the x-axis.

3D Restricted Waveguide

Figures 13A, 13B:
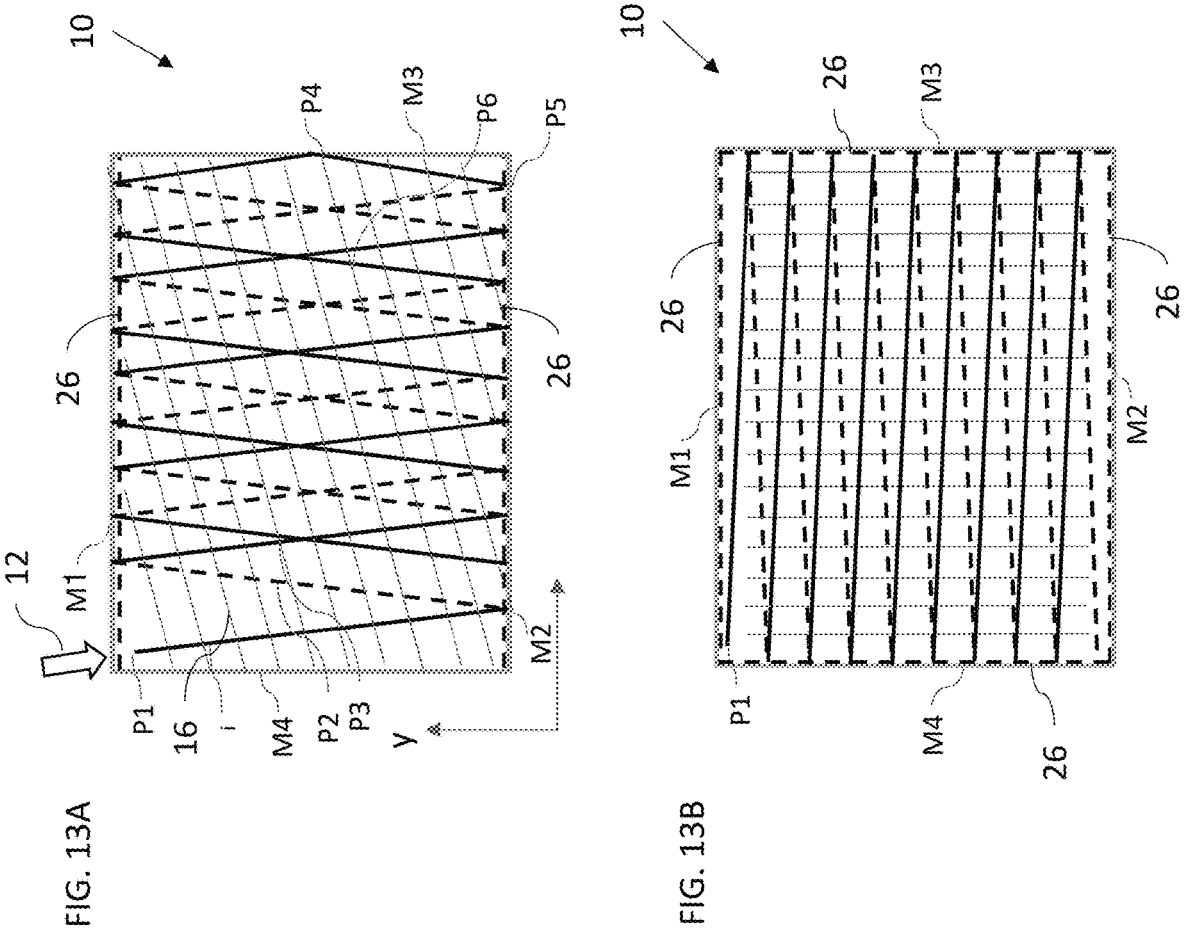
FIGS. 13A and 13B are schematic plan views of display lightguide arrangements, constructed and operative according to further embodiments of the present invention, employing recirculation of image light along two perpendicular directions, with differing initial propagation directions.

Another embodiment of the invention can be seen in FIGS. 13A and 13B. In the case of FIG. 13A, there are four mirrors on all edges of the waveguide (M1 parallel to M2, and M3 parallel to M4), and two fractional phase plates 26 inside the top and bottom edges. In the case of FIG. 13B case there are four mirrors and four fractional phase plates 26 on all waveguide edges. Due to a combination of TIR and the parallel mirrors, the injected image light is trapped in all three dimensions in both these cases.

In FIG. 13A, S-polarized ray i is injected into the waveguide in P1. Like the case of FIG. 7A, above, ray i polarization repeatedly switches between S and P polarization as the ray propagates in the x direction. When ray i impinges on M3, it will be reflected to the lightguide as S-polarization. As returning ray i at P6 has odd reflection compared to propagating ray i at P2, P3 the returning image will be rotated compared to the propagating image. This can be mitigated by controlling the LOE facet angles and coating reflection as function of incident ray angle to the extent that only propagating ray i will be coupled out of the waveguide. Polarization selectivity in relation to two of the four images propagating within lightguide 10 together with angular selectivity provides more design flexibility to select the desired sole image for coupling out.

Figures 14A, 14B, 14C:
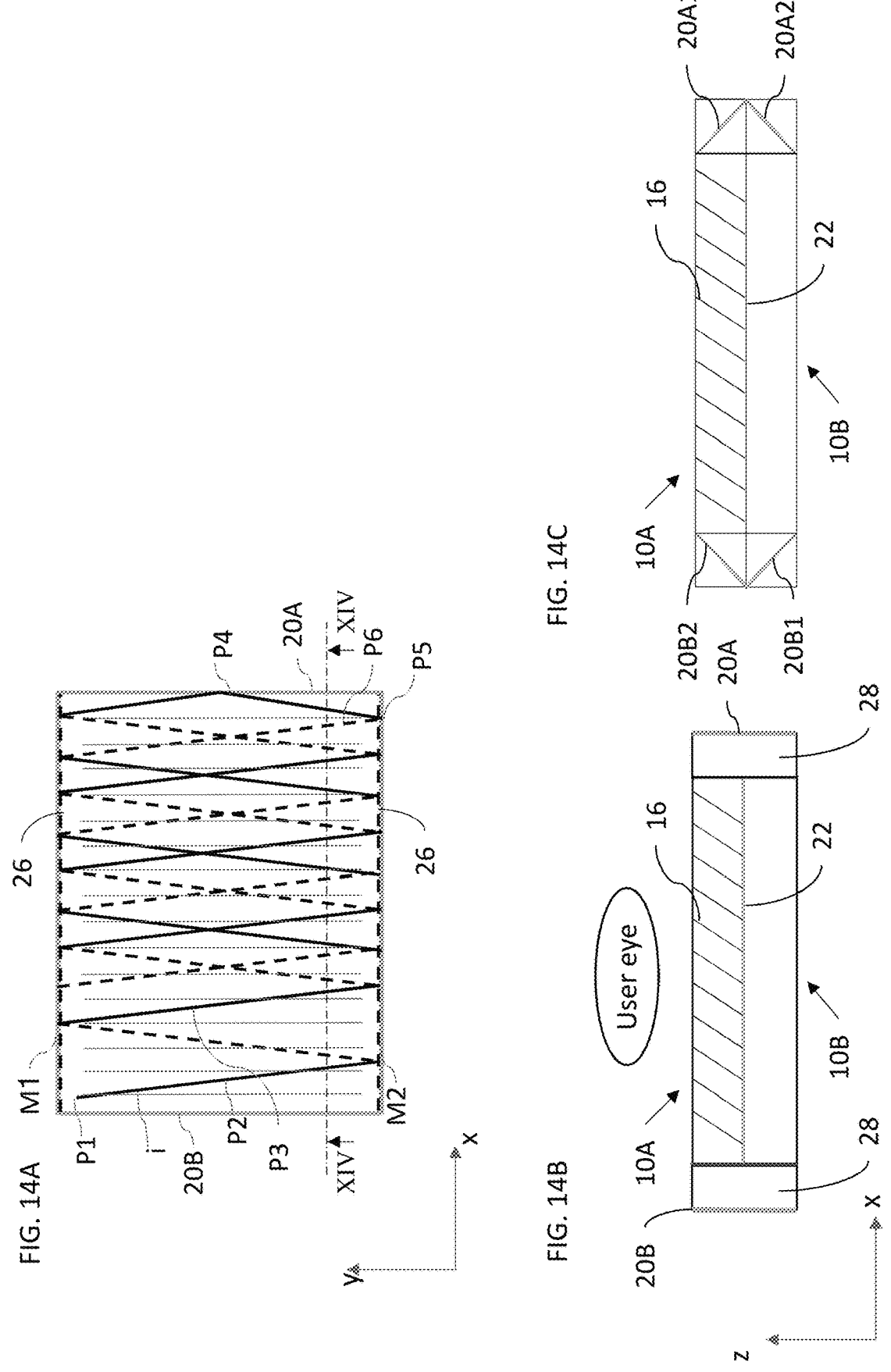
FIG. 14A is a schematic plan view of a display lightguide arrangements, constructed and operative according to a further embodiment of the present invention, employing recirculation of image light along two perpendicular directions, one within a first lightguide and a second via a second lightguide.
FIGS. 14B and 14C are cross-sectional views along the line XIV-XIV in FIG. 14A according to two variant implementations of the display lightguide arrangement.

Another method to couple out only propagating images is illustrated in FIGS. 14A and 14B, which combines the double waveguide approach of FIGS. 2-5B for containing one dimension together with the polarization-management approach of FIG. 6 for the second dimension. The various components are each labeled using the same reference numbers as used throughout this document for equivalent features.

The size of the coupling region (where index-matched adhesive is used to avoid TIR and allow transfer of image light between the lightguides) is typically tailored for a single field, and may lead to a "hole" in aperture filling, where light that is intended to be coupled to the lower waveguide 10B, is reflected back into waveguide 10A. To address this effect, it may be advantageous to use a configuration as illustrated in FIG. 14C, analogous to the configuration of FIG. 3E, described above, in which light is reflected by two 45-degree reflectors 20A1, 20A2, 20B1 and 20B2 (e.g., right-angle prisms), allowing the entire interface of bonding between waveguides 10A and 10B to be implemented with a low refractive index adhesive (or air space) that maintains TIR conditions for rays incident above a critical angle.

Figures 15A, 15B, 15C:
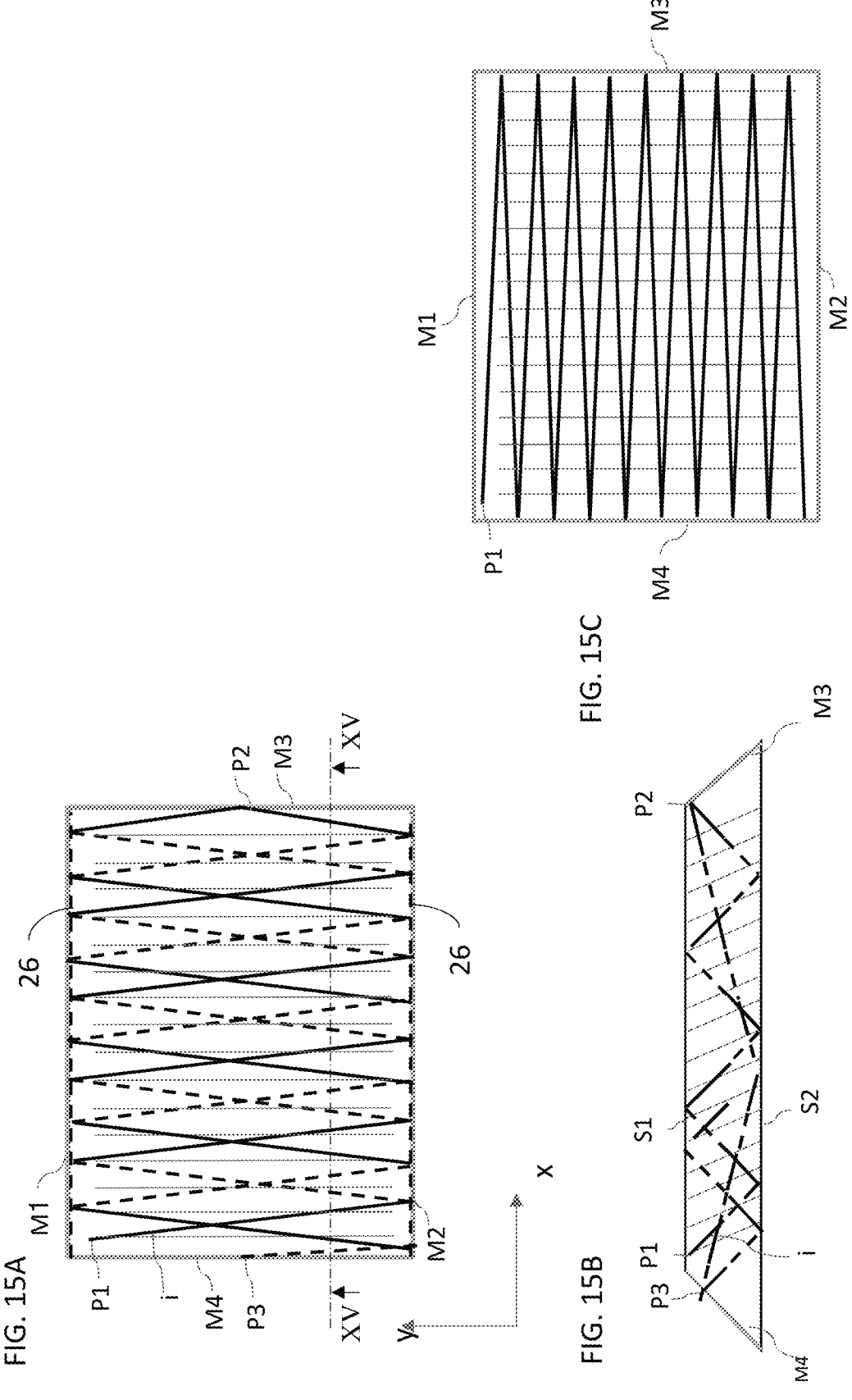
FIG. 15A is a schematic plan view of a display lightguide arrangement, constructed and operative according to a further embodiment of the present invention.
FIG. 15B is a cross-sectional view along the line XV-XV in FIG. 15A.
FIG. 15C is a schematic plan view of a variant implementation of the display lightguide arrangement of FIG. 15A.

Another approach for coupling out only a propagating image is illustrated in FIGS. 15-15C. In this case, mirrors M3 and M4 are non-parallel. As discussed above in the context of FIGS. 3C and 3D, the angles between mirrors M3 and M4 and the major surfaces must be equal in magnitude but possess reflection symmetry about a plane normal to both the waveguide surface. The use of inclined mirrors M3 and M4 renders the laterally recirculated light rays into a different range of propagation angles, which may facilitate design of angularly-selective partially-reflecting coatings for the facets to select the desired image.

In FIGS. 15A and 15B, an S-polarized ray is injected into the waveguide at P1. Like the case of FIG. 13A, ray i polarization will be switching between S and P polarization as the ray propagates in the x direction. In the current case, when ray i impinges on M3 at P2 it will be reflected back into the lightguide as S-polarization but with different angle vs. major surfaces S1 and S2, as seen in FIG. 15B. Returning ray i impinges on M4 at P3 only to return into the waveguide with the same angle vs major surfaces S1 and S2 as the first propagating ray i. As the non-parallel mirrors switch between two different angular regimes relative to major surfaces, a specific coating can be chosen to reflect out of the waveguide only the propagating image, while fully transmitting the returning rotated image.

The case in which 3D lightguide restriction is done with four non-parallel mirrors is illustrated in FIG. 15C. In this case the angles between mirrors M1 and M2 and the major surfaces must be equal in magnitude but possess reflection symmetry about a plane normal to the waveguide surface. The angles between mirrors M3 and M4 and the major surfaces must be equal in magnitude but possess reflection symmetry about a plane normal to both the waveguide surfaces.

Figures 16A, 16B, 16C:
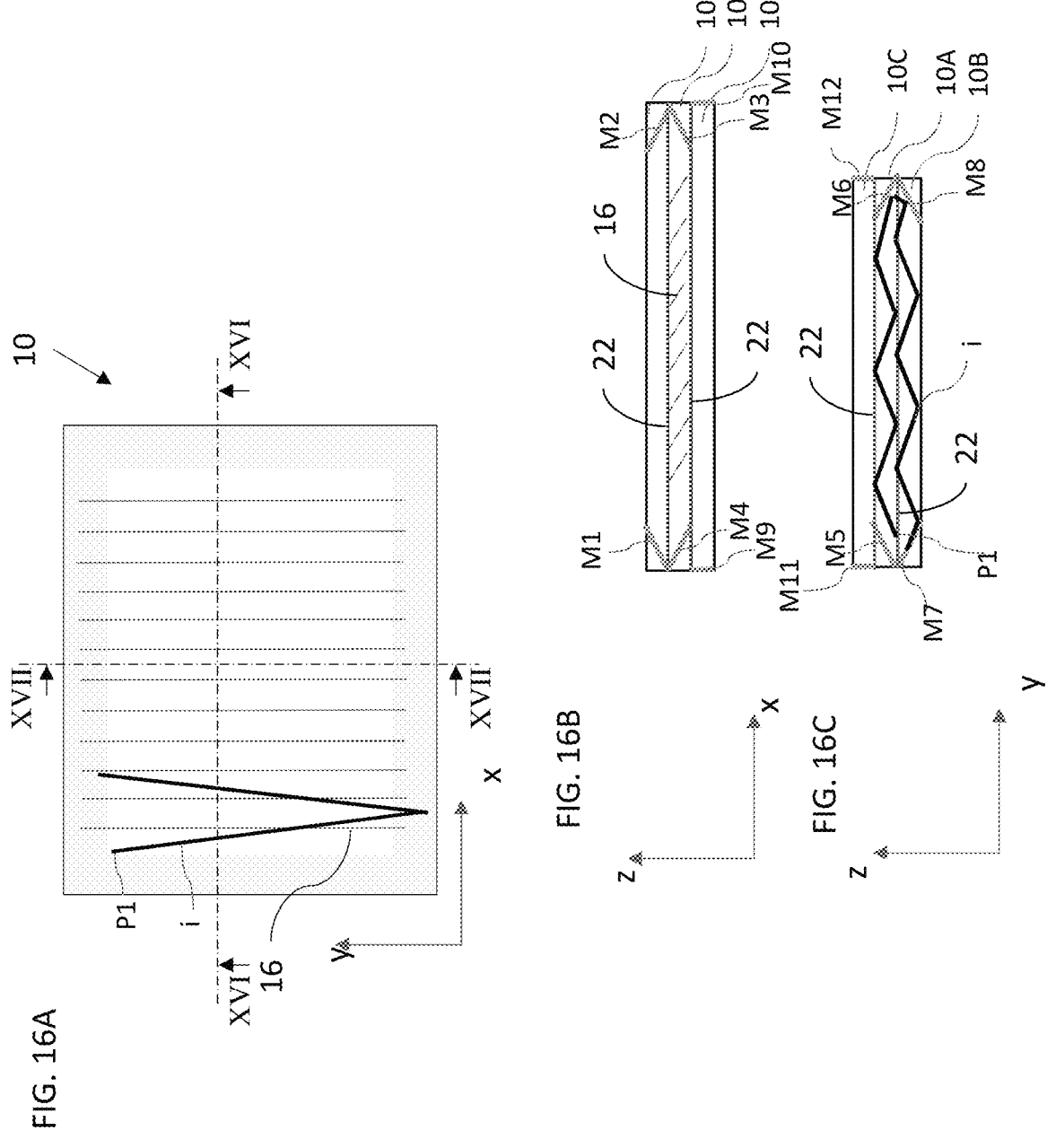
FIG. 16A is a schematic plan view of a display lightguide arrangement, constructed and operative according to a further embodiment of the present invention.
FIGS. 16B and 16C are schematic cross-sectional views taken along the lines XVI-XVI and XVII-XVII in FIG. 16A, respectively.

A further approach for selectively coupling out only a desired propagating image is illustrated in FIGS. 16A-16C. In this case, three waveguides 10A, 10B and 10C are separated by an air gap or a low refractive index adhesive. Lightguide 10A has coupling out facets, while lightguides 10B and 10C, in the current non-limiting example, are clear lightguides. Lightguide 10A is coupled to lightguide 10B by highly reflective mirrors (M5-M8) that have a complementary angle between them (FIG. 16C). Lightguide 10A is coupled to lightguide 10C by another set of highly reflective mirrors (M1-M4) that have a complementary angle between them (FIG. 16B). FIG. 8 shows by way of example such a configuration, where the mirrors are oriented at 45 degrees as compared to the waveguides, and the major surfaces of the waveguides are parallel to one another. Mirrors M9-M12 are additional highly reflective mirrors positioned to confine the light in all three lightguides.

In this example ray i is injected into lightguide 10A at P1. A somewhat similar case was already presented in FIG. 3E, above, for two waveguides. The facet orientation and reflection as a function of angle are chosen specifically to couple out the propagating image while reducing unwanted ghosts to a minimum.

As 3D restriction preserves energy on all three axes, the system is expected to be more efficient than prior art 1D, and the above-described 2D restricted waveguides. The 3D case mixer element can therefore be less efficient.

Figure 17:
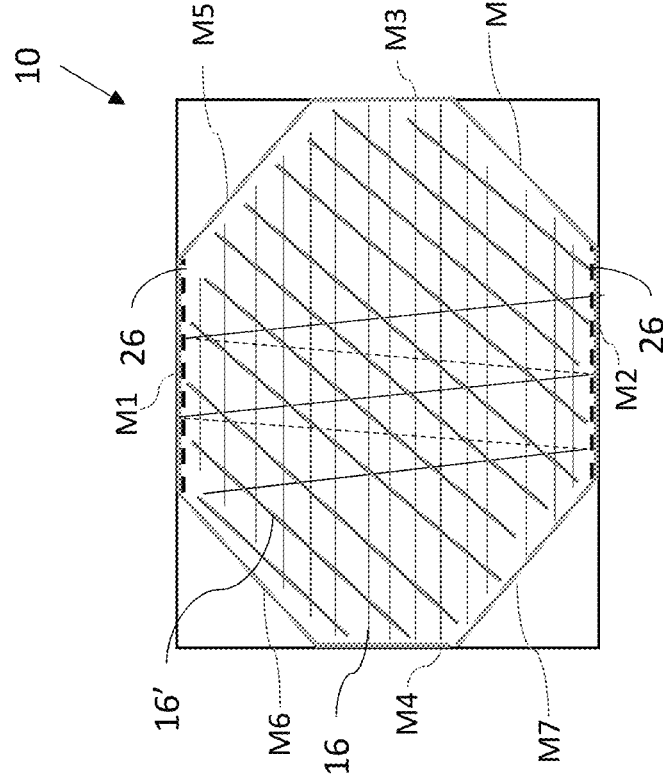
FIG. 17 is a schematic plan view of a display lightguide arrangement, constructed and operative according to a further embodiment of the present invention, employing eight containment reflectors.

Although the examples illustrated thus far for 3D and 2D confinement have related to rectangular confinement between two pairs of parallel reflectors arranged orthogonally to each other, and one set of partially-reflecting facets, other confinement shapes can be made such as, for example, triangular, circular, hexagonal etc., and additional sets of partially-reflecting facets may be used, with or without reflection or rotation symmetry about the normal to the waveguide major surfaces. One alternative example that employs additional degrees of design freedom is shown in FIG. 17, which employs 3D confinement using four pairs of parallel mirrors, labeled M1-M8, and includes two sets of partially-reflecting facets 16, 16' arranged at different angles. Waveplates of quarter-wave, eighth-wave or any other fractional waveplate 26, can be associated with any or all of the mirrors.

Figures 18A, 18B:
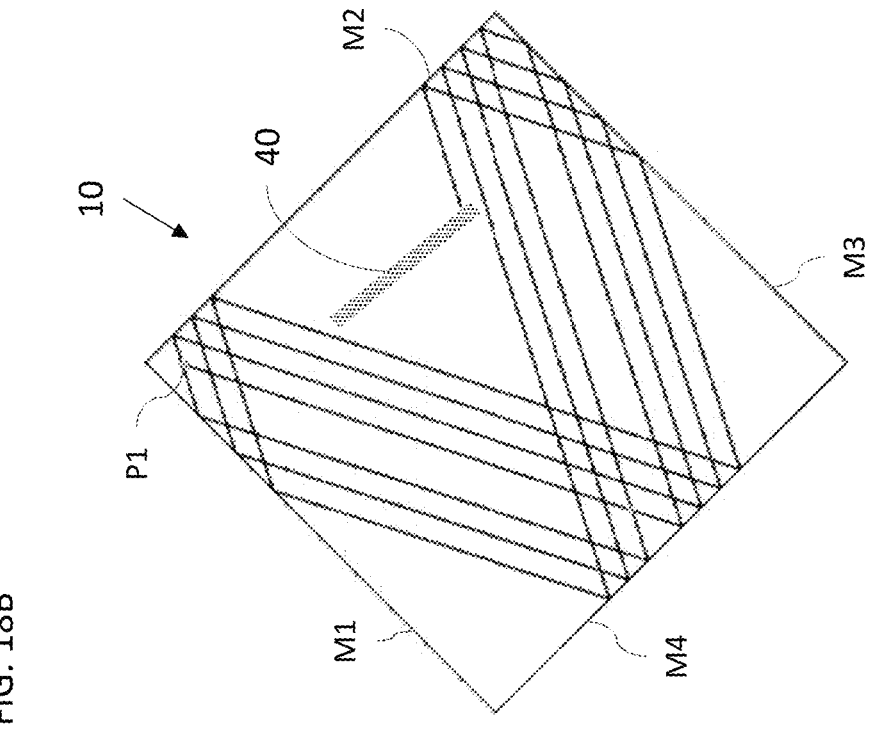
FIGS. 18A and 18B are schematic plan views of display lightguide arrangements, constructed and operative according to further embodiments of the present invention, illustrating the use of a selective light-absorbing element to limit selected light paths.

Another degree of freedom is illustrated in FIGS. 18A and 18B. In this case, an absorbing layer 40 is positioned on the side of the lightguide (FIG. 18A) or inside the lightguide (FIG. 18B) in order to stop unwanted optical paths.

The examples illustrated herein have employed reflective lightguides based on arrays of partially-reflecting internal surfaces to illustrate various aspects of the present invention. The present invention, however, is not limited to such implementations, and can equally be implemented in light-guides employing pin mirror lightguides, and diffractive lightguides employing surface or volume diffractive optical elements, etc.

Another degree of freedom would be to use an active half wave plate on one or all of the confinement mirrors. with or without the use of another lightguide.

A final example which uses already-explained degree of freedom in a somewhat different configuration is illustrated in FIGS. 19A-19C. In this case, ray i is injected into lightguide using coupling-in element A. Ray i is guided through the top lightguide between mirrors M1 and M2 with their respective QWP's, and major surfaces S1 and S2, until reaching mirror M3 where the image light is reflected so as to return through the unfaceted lightguide guided between M1 and M2 and their respective QWP's, and major surfaces S2 & S3, until reaching mirror M4 and returning into the faceted lightguide as ray j. The propagation angles of ray i can be chosen in such a way that ray j and rays $j_n$ do not hit the coupling-in element.

Alternatively, in another case, ray j or rays $j_n$ will hit couple in element. In this case, the coupling-in element would be a retro couple-in prism that is a specially cut prism which causes entering ray j to exit with the complementary needed angles (same angle orientation as ray i). The coupling-in element may employ a partial mirror (for example, 10% transmitting and 90% reflecting, or other ratios).

It will be appreciated that the above descriptions are intended only to serve as examples, and that many other embodiments are possible within the scope of the present invention as defined in the appended claims.

What is claimed is:

1. A display for delivering image light to an observer, the display comprising:
   (a) a first lightguide comprising a block of transparent material having two mutually-parallel major surfaces for supporting propagation of image light by internal reflection at said major surfaces, said lightguide containing at least one set of internal mutually-parallel partially-reflecting surfaces obliquely angled to said major surfaces so as to progressively couple-out part of the image light propagating in a first direction so as to be reflected towards an observer while transmitting part of said image light to continue propagating in said first direction within said first lightguide;
   (b) a second lightguide comprising a block of transparent material having two mutually-parallel major surfaces for supporting propagation of image light by internal reflection at said major surfaces, said second lightguide being deployed in stacked-relation to said first lightguide;
   (c) a first reflective coupling configuration comprising a single planar mirror oriented with a first inclination to said major surfaces of said first and second lightguides and a light-transfer region adjacent to said single planar mirror within which there is an optical continuum between said first and second lightguides for transfer of image light between said first and second lightguides, said first reflective coupling configuration deployed to reflect the image light transmitted by said set of partially-reflecting surfaces and propagating in said first lightguide in said first direction so as to propagate within said second lightguide in a second direction having a reversed in-plane component from said first direction; and
   (d) a second reflective coupling configuration comprising a single planar mirror oriented with a second inclination, equal but opposite to said first inclination, to said major surfaces of said first and second lightguides and a light-transfer region adjacent to said single planar mirror within which there is an optical continuum between said first and second lightguides for transfer of image light between said first and second lightguides, said second reflective coupling configuration deployed to reflect the image light that has traversed said second lightguide in said second direction so as to be reintroduced to propagate in said first lightguide in said first direction, such that at least part of the image light transmitted by said set of partially-reflecting surfaces in a first pass through said partially-reflecting surfaces is coupled out so as to be reflected towards the observer when again incident on said partially-reflecting surfaces.

2. A display for delivering image light to an observer, the display comprising:
   (a) a first lightguide comprising a block of transparent material having two mutually-parallel major surfaces for supporting propagation of image light by internal reflection at said major surfaces, said first lightguide containing at least one set of internal mutually-parallel partially-reflecting surfaces non-parallel to said major surfaces so as to progressively redirect part of the image light propagating in a first direction so as to propagate by internal reflection within the first lightguide in a third direction while transmitting part of said image light to continue propagating in said first direction within said first lightguide;

(b) a second lightguide comprising a block of transparent material having two mutually-parallel major surfaces for supporting propagation of image light by internal reflection at said major surfaces, said second lightguide being deployed in stacked-relation to said first lightguide;

(c) a first reflective coupling configuration comprising a single planar mirror oriented with a first inclination to said major surfaces of said first and second lightguides and a light-transfer region adjacent to said single planar mirror within which there is an optical continuum between said first and second lightguides for transfer of image light between said first and second lightguides, said first reflective coupling configuration deployed to reflect the image light transmitted by said set of partially-reflecting surfaces and propagating in said first lightguide in said first direction so as to propagate within said second lightguide in a second direction having a reversed in-plane component from said first direction; and (d) a second reflective coupling configuration comprising a single planar mirror oriented with a second inclination, equal but opposite to said first inclination, to said major surfaces of said first and second lightguides and a light-transfer region adjacent to said single planar mirror within which there is an optical continuum between said first and second lightguides for transfer of image light between said first and second lightguides, said second reflective coupling configuration deployed to reflect the image light that has traversed said second lightguide in said second direction so as to be reintroduced to propagate in said first lightguide in said first direction, such that at least part of the image light transmitted by said set of partially-reflecting surfaces in a first pass through said partially-reflecting surfaces is redirected to propagate in said third direction when again incident on said partially-reflecting surfaces.

3. The display of claim 1, wherein said optical continuum is implemented by connecting said first lightguide to said second lightguide using an index-matched adhesive.

4. The display of claim 1, wherein said optical continuum is implemented by connecting a continuous block of transparent material to an edge surface of said first lightguide and said second lightguide.

5. The display of claim 1, wherein said second lightguide is attached to said first lightguide by a layer of adhesive having a lower refractive index than said transparent material of said first and second lightguides.

6. The display of claim 1, wherein said second lightguide is separated from said first lightguide by an air gap.

7. A display for delivering image light to an observer, the display comprising:

(a) a lightguide comprising a block of transparent material having two mutually-parallel major surfaces for supporting propagation of image light by internal reflection at said major surfaces, said lightguide containing at least one set of internal mutually-parallel polarization-selective partially-reflecting surfaces obliquely angled to said major surfaces so as to progressively couple-out part of the image light of a first polarization propagating in a first direction so as to be reflected towards an observer while transmitting part of said image light of said first polarization to continue propagating in said first direction within said lightguide, said partially-reflecting surfaces being substantially transparent to light of a second polarization orthogonal to said first polarization;

(b) a first reflective configuration comprising a quarter-wave phase plate and a planar mirror, said first reflective configuration deployed to reflect the image light transmitted by said set of partially-reflecting surfaces so as to propagate within said lightguide in a second direction having a reversed in-plane component from said first direction and a rotated polarization so as to be transmitted by said partially-reflecting surfaces; and (c) a second reflective configuration comprising a quarter-wave phase plate and a planar mirror, said second reflective configuration deployed to reflect the image light that has traversed said lightguide in said second direction so as to propagate within said lightguide in a direction parallel to said first direction, such that at least part of the image light transmitted by said set of partially-reflecting surfaces in a first pass through said partially-reflecting surfaces is coupled out so as to be reflected towards the observer when again incident on said partially-reflecting surfaces.

8. The display of claim 7, further comprising an image injection aperture for injecting the image light into said lightguide so as to propagate in said first direction image by internal reflection at said major surfaces, and wherein said first direction is inclined relative to said first and second reflective configurations such that the image light introduced at said image injection aperture is incident on a first region of said partially-reflecting surfaces and, after reflection from said first reflective configuration and said second reflective configuration, is incident on a second region of said partially-reflecting surfaces, said second region being at least partially non-overlapping with said first region.

9. The display of claim 8, wherein a reflectivity of said partially-reflecting surfaces in at least said first region is such that a majority of the image light injected at said image injection aperture is transmitted through said set of partially-reflecting surfaces and recirculated by reflection at said first and second reflective configurations.

10. The display of claim 8, wherein said quarter-wave phase plate is part of a progressively varying phase plate.

11. The display of claim 8, further comprising a partially-reflecting surface deployed internally to said lightguide, perpendicular to said major surfaces and parallel to said first and second reflective configurations.

12. A display for delivering image light to an observer, the display comprising:

(a) a lightguide comprising a block of transparent material having two mutually-parallel major surfaces for supporting propagation of image light by internal reflection at said major surfaces, said lightguide containing at least one set of internal mutually-parallel polarization-selective partially-reflecting surfaces non-parallel to said major surfaces so as to progressively redirect part of the image light propagating in a first direction so as to propagate by internal reflection within said lightguide in a third direction while transmitting part of said image light to continue propagating in said first direction within said lightguide, said partially-reflecting surfaces being substantially transparent to light of a second polarization orthogonal to said first polarization;

(b) a first reflective configuration comprising a quarter-wave phase plate and a planar mirror, said first reflective configuration deployed to reflect the image light transmitted by said set of partially-reflecting surfaces so as to propagate within said lightguide in a second direction having a reversed in-plane component from said first direction and a rotated polarization so as to be transmitted by said partially-reflecting surfaces; and (c) a second reflective configuration comprising a quarter-wave phase plate and a planar mirror, said second reflective configuration deployed to reflect the image light that has traversed said lightguide in said second direction so as to propagate within said lightguide in a direction parallel to said first direction, such that at least part of the image light transmitted by said set of partially-reflecting surfaces in a first pass through said partially-reflecting surfaces is redirected to propagate in said third direction when again incident on said partially-reflecting surfaces.

13. The display of claim 2, wherein said second lightguide is attached to said first lightguide by a layer of adhesive having a lower refractive index than said transparent material of said first and second lightguides.

14. The display of claim 2, wherein said second lightguide is separated from said first lightguide by an air gap.

15. The display of claim 2, wherein said optical continuum is implemented by connecting said first lightguide to said second lightguide using an index-matched adhesive.

16. The display of claim 2, wherein said optical continuum is implemented by connecting a continuous block of transparent material to an edge surface of said first lightguide and said second lightguide.

\* \* \* \* \*